Sept. 27, 1960 W. M. O'CONNOR 2,954,188
LANDING GEAR FOR AIRCRAFT
Filed July 7, 1954 4 Sheets-Sheet 1
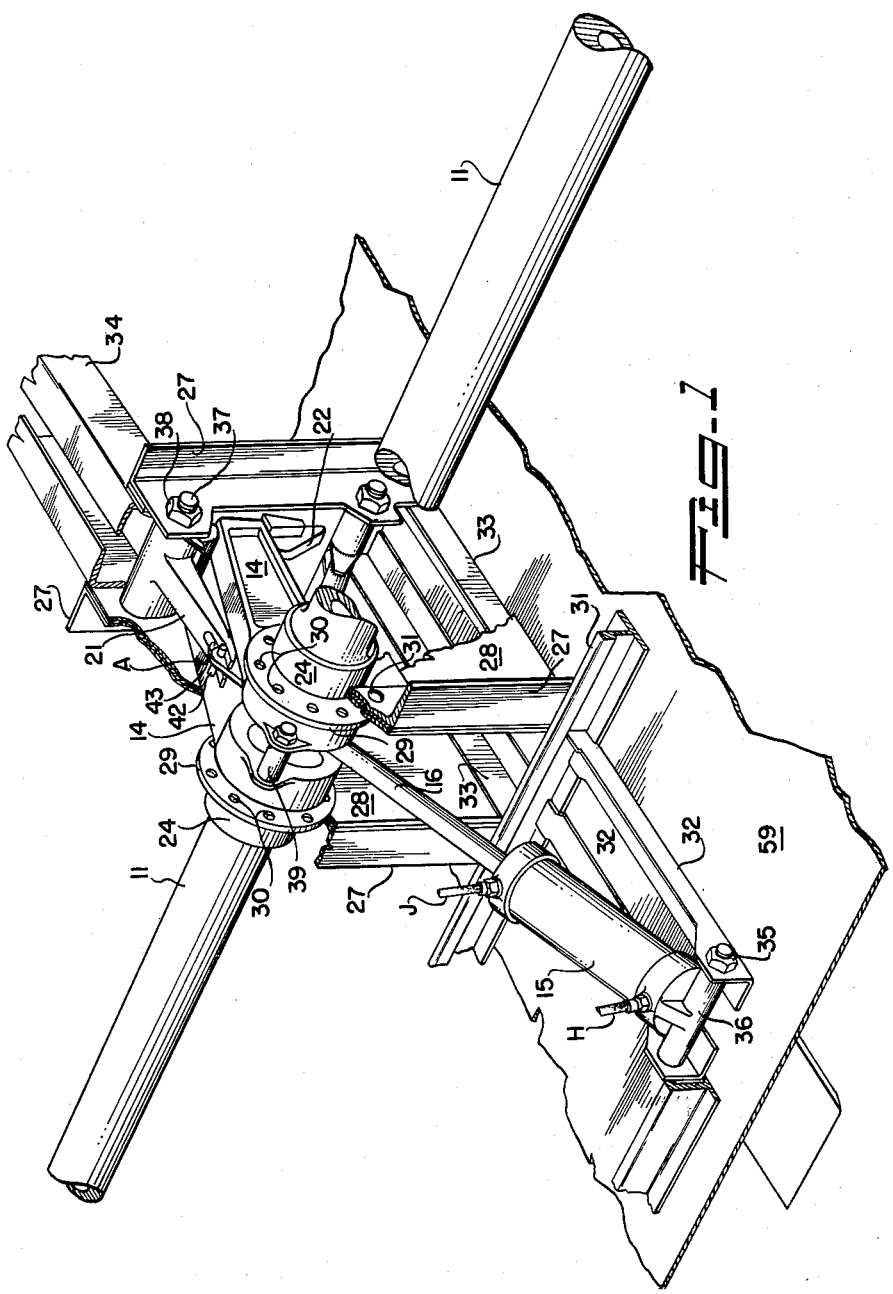
INVENTOR.
WILLIAM M. O'CONNOR
BY
George Sullivan
Agent

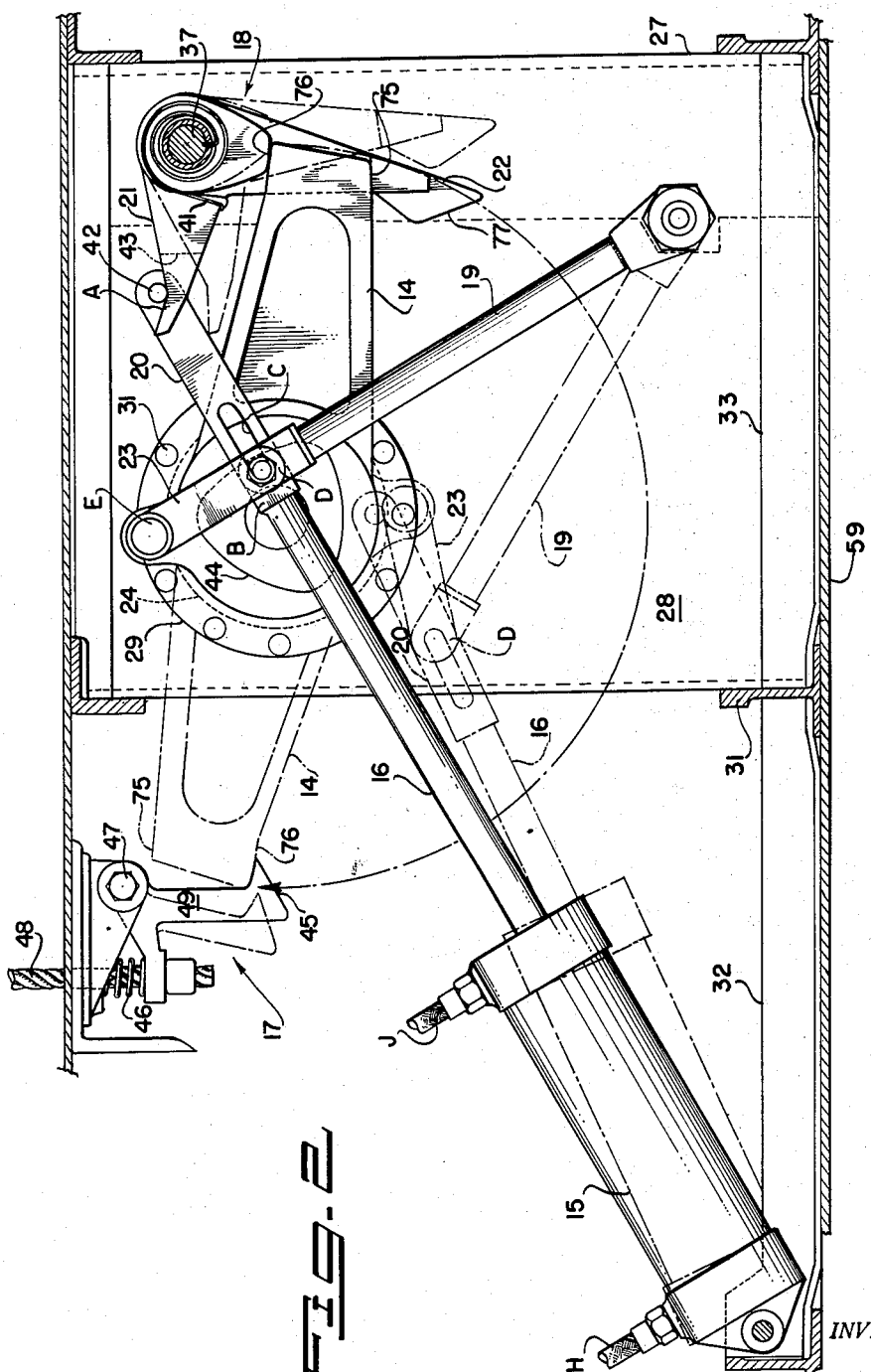

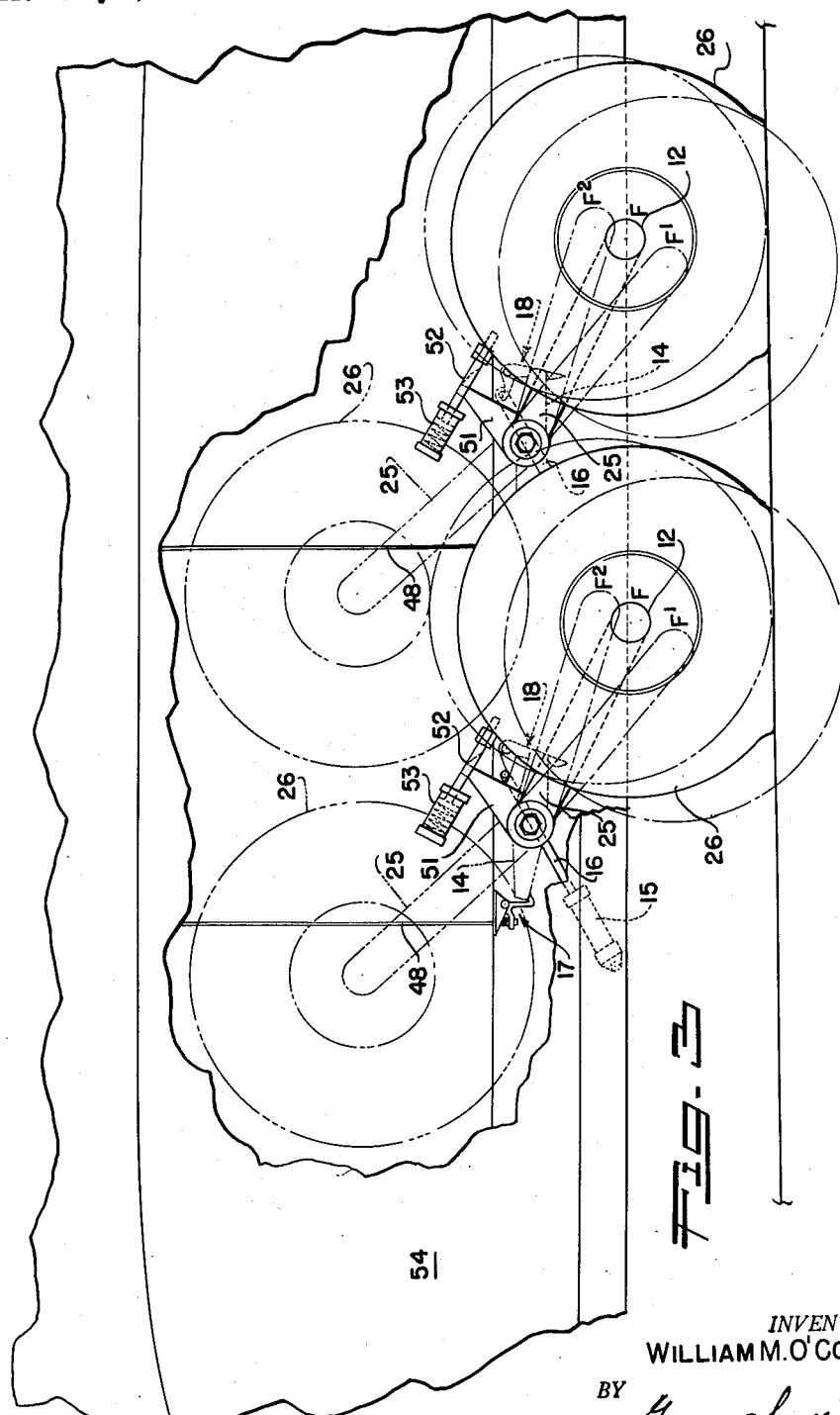

Sept. 27, 1960 W. M. O'CONNOR 2,954,188
LANDING GEAR FOR AIRCRAFT
Filed July 7, 1954 4 Sheets-Sheet 4
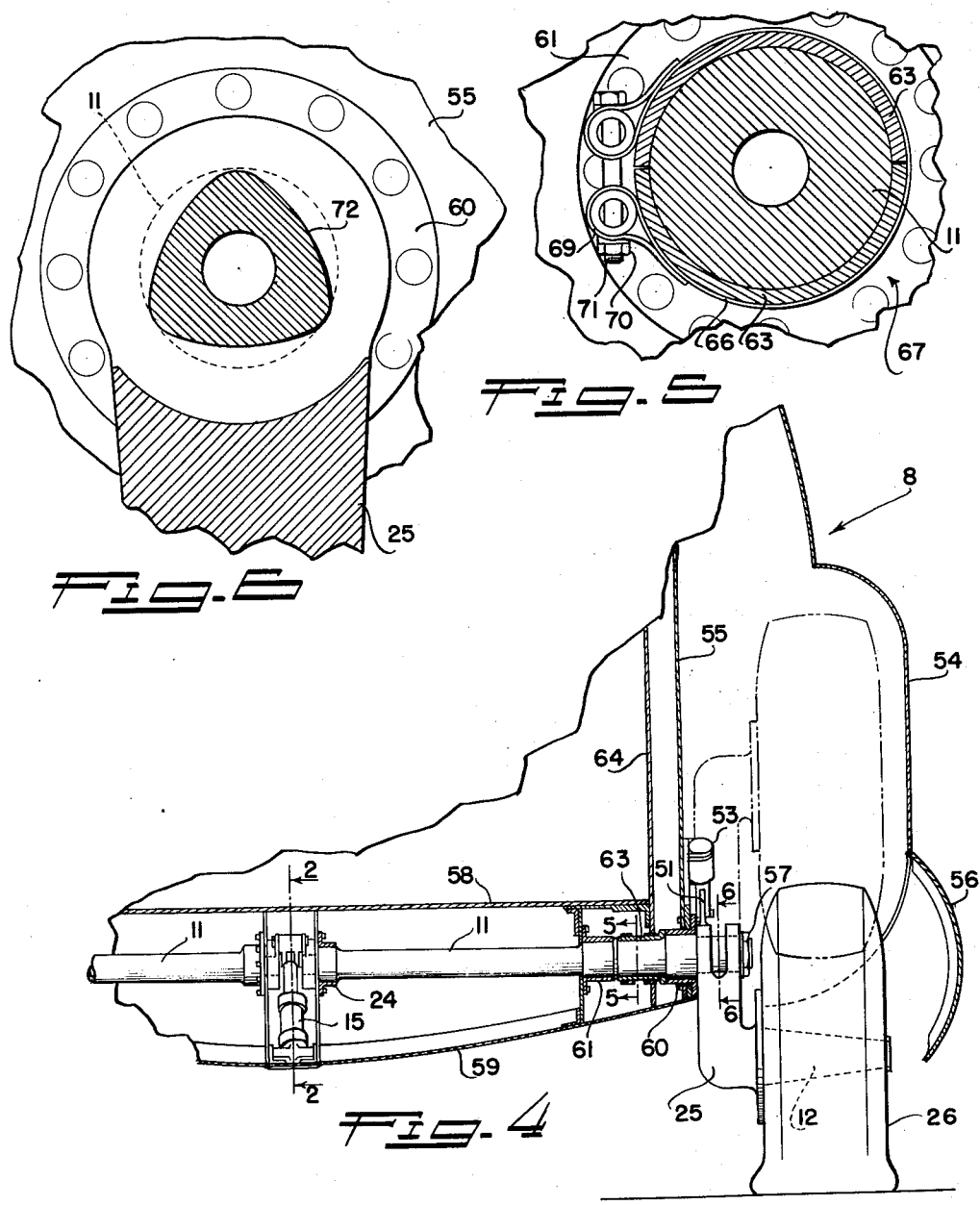
INVENTOR.
WILLIAM M. O'CONNOR
BY
Agent

United States Patent Office 2,954,188
Patented Sept. 27, 1960

2,954,188

LANDING GEAR FOR AIRCRAFT

William M. O'Connor, Marietta, Ga., assignor to Lockheed Aircraft Corporation, Burbank, Calif.

Filed July 7, 1954, Ser. No. 441,791

5 Claims. (Cl. 244—102)

This invention relates to retractable landing gear for aircraft and more particularly to a torsion bar spring landing gear suspension system.

A landing gear for aircraft generally consists of a piston type shock strut mounted on the aircraft structure utilizing either hydraulic fluid, compressed air, or a combination of both to absorb the static and dynamic loads developed by an aircraft during the landing and take-off cycles. The type of landing gear above mentioned is characterized to a great extent by its complexity and numerous parts. A constant check must be made on strut air pressure or fluid level, as the case may be. These types of landing gear mentioned require close tolerances, special plating and grinding and very complicated assemblies. It is also necessary that skilled personnel be used to install and adjust the landing gear assemblies.

The torion bar suspension system of the present invention by utilizing only steel bars, brings the cost of aircraft landing gears down to the cost per pound level of automobile suspensions. This system, to be hereinafter described, requires no close tolerances, special plating and grinding, complicated assembly, careful handling or special finishes. It does not require special jigging when being assembled to the airframe. This type of landing gear can be installed by semi-skilled labor using standard tools. The parts of a torsion bar landing gear system may be roughly handled during installation without fear of affecting their proper function. Spare parts are held to a minimum as wear does not affect this type of gear to the degree experienced with shock struts. All members of the torsion bar system are rugged enough to render service in excess of the estimated life of the airframe.

As the torsion bar system depends solely on the mechanical strength of the steel bars, it requires no more attention than an occasional greasing of the moutning bearings. It eliminates the need for a constant check of strut air pressure and fluid level. It also eliminates the necessity for checking seals, wipers, and like parts necessary to a shock strut. Only a single actuation point requires checking since opposite wheels are operated from a single actuation source.

No dismantling of parts to check for scoring or wear is necessary and no stock of special seals, fluids, valves, tools, etc. are required to maintain this gear. There are no special cleaning or wiping operations required for the torsion bar system when it is mounted on the airplane due to the fact that the actuating mechanism is completely housed within the airframe.

Having briefly set out some of the more obvious advantages of the torsion bar system of landing gear for aircraft over the more familiar types of landing gear, the following objects of the present invention become readily apparent.

It is an object of the present invention to provide a cheap, economical and simple landing gear.

It is an object of this invention to provide a landing gear relatively free of critical machined parts.

It is a further object of this invention to provide a landing gear that can have the retraction and shock absorbing mechanisms completely housed within the aircraft fuselage.

It is a still further object of this invention to provide a landing gear for aircraft that is easy to service and maintain in operational condition.

It is a further object of the present invention to provide a retractable or fixed torsion bar spring landing gear suspension system capable of supporting an aircraft during the ground operational cycle.

It is a further object of the present invention to provide a landing gear for aircraft that utilizes a torsion bar type of gear which provides a reserve of energy to overcome possible excessive landing impacts. The only effect of landing impacts exceeding the yield point of the torsion bar would be a permanent set therein, the bar yielding to transfer excess energy into ground contact by the airplane without the landing gear causing further structural damage to the airplane.

It is also another object of the present invention to provide a landing gear for aircraft that may be relocated in the aircraft, as from one transverse bulkhead position to another in order to achieve different landing characteristics of the aircraft.

It is another object of this invention to provide a retractable torsion bar landing gear of the type described wherein the retraction system will operate in a fail safe manner. This is accomplished by rotating the torque arm forwardly and upwardly, so that a manual release of the uplock will allow the wheel to fall past bottom center into a partially extended trailing position whereby the initial ground contact will move the wheel into its down locked position.

It is a further object of the present invention to provide a torsion bar spring landing gear capable of absorbing the dynamic loads developed by an aircraft during the landing and take-off cycles.

Other objects and advantages will become apparent from the following detailed description of a typical utilization of the invention in which reference is made to the accompanying drawings wherein:

Figure 1 is a perspective view of the retracting and extending apparatus of the invention;

Figure 2 is a side view of Figure 1, taken at line 2—2 of Figure 4;

Figure 3 is a side view of an airplane incorporating a tandem arrangement of the landing wheels of this invention;

Figure 4 is a broken away transverse section through an airplane showing the apparatus of the invention installed in an aircraft;

Figure 5 is a section through the thrust bearing taken at line 5—5 of Figure 4; and Figure 6 is a section through the torque arm as mounted on the torsion bar taken at line 6—6 of Figure 4.

Referring now to Figure 1 of the drawings there is shown the general arrangement of the parts that compose the torsion bar landing gear retracting and locking mechanism along with the aircraft structure necessary for the torsion bar landing gear installation.

The torsion bar landing gear retracting apparatus common to a pair of opposite wheels is composed partially of two torsion bars 11 whose inboard ends terminate at the apparatus, to be hereinafter described, and whose outboard ends each support a torque arm 25 and a suitable landing wheel 26. At this point a reference to Figure 4 will show the arrangement of the torsion bar 11, the torque arm 25 and a wheel element 26. However, for the sake of simplicity and to eliminate duplication in the drawings and description, only one torque arm 25 and wheel 26 is shown.

In Figure 1, the torsion bar 11, shown extended from the right hand portion of the drawings, has been broken away in order to allow a clear and unobstructed view of the parts of the retracting and locking mechanism.

The inboard end of the torsion bar 11, Figure 1, is shown inserted through a torsion bar inboard bearing 24. As shown, the said torsion bar inboard bearing 24 is supported in place by a structural box comprising member 27 and associated metal sheets 28. A series of holes 30 in a flanged portion 29 of the said torsion bar inboard bearing 24 provide the means of inserting attaching means 31, in order to hold the torsion bar inboard bearing 24 in place against the sheets 28.

On a part of the torsion bar 11 extending into and through the torsion bar inboard bearing 24, a lock-out arm 14 is secured. As will be noted, a description of the right torsion bar 11 and its associated apparatus is the same for both torsion bars 11 shown. A view, Figure 6, to be subsequently described, will show in greater detail and clarity the method used in joining the torsion bar 11 and the torque arm 25.

Figure 1 also shows the retraction cylinder 15 which is a double acting cylinder which may be either hydraulic or air operated. It is possible that other means of operating the retraction mechanism could be used, such as an electrically operated screw jack. However, for this particular installation a variable fluid pressure system is used.

As may be seen, still being concerned with Figure 1, one end of the retraction cylinder 15 is secured to two support members 32 by means of a bolt 35 run through an attaching portion 36 of the said cylinder 15 which allows a pivoting movement of the cylinder 15. The need for this movement will be hereinafter described.

The end of the cylinder 15 opposite the point of attachment above described is furnished with a piston rod 16 which is operated by the internal mechanism of the cylinder 15 (not shown). The piston rod 16 passes between the two lock-out arms 14 and is shown at Point A, resting on the lock-out arm cam 21.

The lock-out arm cam 21, above referred to, is secured to the support member 27 by means of a lock-out arm bolt 37 and nut 38. The securement is such as to allow the lock-out arm cam 21 to pivot at this point.

The lock-out arm cam 21 and the lock-out arm catch 22 are parts of a downlock mechanism 18, which is more clearly depicted in Figure 2, and which will now be described.

The apparatus is shown, Figure 2, as it appears when the landing gear is in the fully extended position, as shown by the solid line portion of the drawing. This view shows more clearly the downlock mechanism 18, the uplock mechanism 17, the uplock position in broken lines and the downlock position in solid lines of the lock-out arm 14, the piston rod 16, a piston rod extension 20, an upper link 23 and a lower link 19.

In the downlock position of the landing gear shown in solid lines, the lock-out arm 14 is engaged by and restrained in place by a lock-out arm catch 22. The lock-out arm catch is held in engagement with the lock-out arm 14 by a spring 41 which maintains a lock-out arm cam 21 and the lock-out arm catch 22 in the downlock position.

The piston rod extension 20 is an extension of the piston rod 16 and is different in form than the piston rod. The piston rod extension 20 would appear rectangular in cross section. The piston rod extension 20 is secured to the piston rod 16 at B. A slot C is cut out of the piston extension 20 in which one end of the lower link 19 is free to move. The end of the piston rod extension 20, not secured to the piston rod 16, has inserted, transversely, through its most narrow portion a rod 42 which is positioned so as to be free to move along the cam portion of the lock-out arm cam 21. The lock-out arm cam 21 is provided with a cut out portion 43 to receive the end of the said piston rod extension 20.

The lower link 19, heretofore mentioned as having one end free to move in the slot C in the piston rod extension 20, has its other end pivotally secured to the support member 27. As a projection of the lower link 19 an upper link 23 is pivotally mounted to the said lower link 19 at D and is also movably mounted to the hub of said lock-out arm 14 at E.

In Figure 2 there is shown the end portion of the torsion bar 11 which has been shaped into a generally triangular form 44. A corresponding shaped opening is a part of the lock-out arm 14 into which the triangular form 44 of the torsion bar 11 is inserted. The torque arm 25 fits over the outboard end of the torsion bar 11 with the same type of engagement as shown in Figure 6, where the triangular form is designated 72.

There is also shown in Figure 2 the uplock mechanism 17 which is shown in engagement with the lock-out arm 14 when the landing gear, Figures 3 and 4, is retracted or in the uplock position. The body 49 portion of the uplock mechanism 17 is spring loaded at 46 and pivots about the point 47. A portion of the body 49 is formed into a hook 45 which is shown restraining the lock-out arm 14. A cable 48 is secured to the uplock mechanism 17 in order to release, from a possibly remote location (not shown) the uplock mechanism 17.

Again, for purposes of simplicity, a common type of manually operated cable release for the uplock mechanism 17 is shown. It is quite evident, however, that there are a wide variety of possible releasing activators.

Figure 3 of the drawings shows a tandem arrangement of two landing gear configurations with the wheels in solid lines in the static loaded position. A point, designated F, indicates the corresponding position of the torque arm 25 and is also shown in solid lines and broken lines of the drawings. $F^1$ indicates a no-load condition of the landing gear and $F^2$ indicates the position of the landing gear under maximum compression.

Continuing with Figure 3, there is shown a damper 53 and a damper arm 51 which engages therewith at 52 in the landing gear down or static position. The dampening arm 51 is a prolongation of a portion of the torque arm.

In Figure 4 of the drawings one wheel 26 of the landing gear system is shown in the static position in solid lines and in the fully retracted position by the broken line portion of the drawings. The torque arm 25 is shown carried on the torsion bar 11 which is held in place by a torsion-bar torque arm nut 57. The outside skin 54 of the wheel-well 8 and the inside skin 55 of the wheel-well 8 is next noted in this figure with the door 56 of the wheel-well 8 shown in an open position.

The floor 58 of the aircraft is shown with the outside skin 59 of the aircraft also indicated. It is this cavity or space, between the floor 58 and the outside skin 59, that the mechanism or apparatus of the landing gear of the present invention is installed, as will be hereinafter described, along the center-line of the aircraft and extending outboard on both sides.

In Figure 4, however, only one complete half of the landing gear installation is shown in order to again simplify the drawings and description as either side would be the same.

It will be observed that there are three support bearings for the part of the landing gear shown or rather the torsion bar 11. One bearing 60, located through the outside skin of the aircraft into the wheel-well 8, another bearing located at 61 which is an intermediate support point, and the last support being located at 24 which is the torsion bar inboard bearing heretofore referred to. In the same figure a split sleeve thrust bearing 63 is shown which is more clearly shown in cross section in Figure 5 which will next be described.

Figure 5 shows the use of a split sleeve thrust bearing 67 positioned about the torsion bar 11 and secured in place by a thrust bearing clamp 66. The clamp 66 is locked in place by the bolt 71 and nut 70. The said bolt 71 is through the looped back portion 69 of the clamp 66 and secured by the nut 70.

The operation of the torsion bar landing gear system is built principally about an energy absorbing member which is a torsion bar 11 mounted transversely below the aircraft floor 58 in the series of bearings 24, 60, 61 and 63.

The inboard end of the torsion bar 11, located near the center line of the airplane, provides attachment for a retracting mechanism, and lock-out arm 14 for restraining the torsion bar 11, torque arm 25 and wheel 26 in either the retracted or extended position.

The outboard end of the torsion bar 11 extends beyond the outboard bearing 60 and provides attachment for the torque arm 25 which, in turn, bears the axle 12 and the wheel 26.

Landing loads introduced at the wheel 26 are transmitted to the torsion bar 11 by the torque arm 25. The torsion bar 11, being fixed at its inboard end by the lock-out arm 14 and its lock 18, absorbs the transmitted loads by angular deflection. The reaction at the end of the torque arm 25 due to the loads imposed on the wheel 26 causes the torque arm 25 to deflect radially about the center axis of the torsion bar 11, causing the torsion bar 11 to twist or deflect torsionally and the elasticity of the torsion bar 11 gives the needed cushioning effect.

Mechanical extension or retraction of the landing gear is accomplished by rotating the torsion bar by means of the double acting retracting cylinder 15.

The solid line portion of Figure 2 is the position of the various parts of the mechanism that would place the landing gear in the fully extended and locked position.

As fluid pressure is applied to the double acting retracting cylinder 15 through the connection J by means of a pressure line and valve incorporated as part of a fluid pressure system (not shown) the piston rod 16 begins to withdraw into the cylinder 15.

The withdrawal movement of the piston rod 16 causes the piston rod extension 20 to move through the point D to the limits provided by the slot C. As the movement of the piston rod 16 and piston extension rod 20 continues it causes the rod 42 to move along the cam portion A of the lock-out arm cam 21. This movement of the piston extension rod 20 forces the downlock mechanism 18 to move to the broken line position overriding the restraint of the downlock spring 41.

As soon as the lock-out arm catch 22 has moved to the unlocked position, as indicated by the broken line position of the drawing, the lock-out arm 14 will no longer be restrained and will respond to the further movement of the piston 16.

The continued movement of the piston rod 16 will impart a clockwise movement to the lock-out arm 14 and the attached torsion bar 11. The piston rod extension 20, the lower link 19 and the upper link 23 are all joined in a common point D. The movement of the piston rod 16 causes the lower link 19 and the upper link 23 to pivot through the above mentioned point D and continue to move until the limits of the clockwise travel have been attained.

When the above described limits of travel have been reached the movable parts of the landing gear, as shown in Figure 2 in particular, have now reached the position as indicated by the broken line position of the drawings. The lock-out arm 14 is now restrained by the action of the uplock mechanism 17 which will be described in the following paragraph.

As the lock-out arm 14 continues its clockwise movement, as above described, it will ultimately reach and become engaged with the uplock mechanism 17. The heel 75 of the lock-out arm 14 will meet the hook 45 portion at the uplock mechanism 17, forcing the body 49 carrying the hook 45 to move to the position indicated by the broken lines in the drawing, Figure 2.

The action of the retraction cylinder 15 causes the lock-out arm 14 to override the action of the spring 46, thus allowing the hook 45 and lock-out arm 14 to become engaged. In this position the movement of the apparatus in a clockwise direction has now been completed which positions the landing gear in the position shown by the broken line portion of the drawings of Figure 3 which is the fully retracted uplock position.

The landing gear is moved to downlock or extended position by releasing the lock-out arm 14 from the uplock mechanism 17 and reversing the action and movements above described.

The uplock mechanism 17 may be operated by various means, however, for the sake of simplicity, it is shown herein operated by a cable 48. A pull on the cable 48, sufficient to override the tension of the spring 46, will move the body 49 and hook 45 through the pivot point 48 allowing the lock-out arm 14 to move counterclockwise when fluid pressure is supplied to the connection H of the cylinder 15.

The broken line position at Figure 2 also indicates the position of the various movable elements of the landing gear during the releasing and locking of the downlock mechanism 18 and the locking and releasing of the uplock mechanism 17.

When the uplock mechanism 17 is released, as above described, and reverse fluid pressure is supplied to the retraction cylinder 15, a movement in a counterclockwise direction of the lock-out arm 14 results which continues until the said lock-out arm 14 is again in position to become engaged by the downlock mechanism 18.

The piston rod 16, by means of the upper link 23, transmits the above described counterclockwise movement to the lock-out arm 14, causing the toe 76 of the lock-out arm 14 to meet the lock-out arm catch 22 along the surface indicated by the number 77, the down lock spring 41 allowing the entire downlock mechanism 18 to move to the position indicated by the broken line portion of the drawing allowing the said lock-out arm 14 to move to the locked position of engagement with the lock-out arm catch 22 moved back to the solid line position by the spring 41.

The movement of the downlock mechanism 18 allows the piston rod extension 20 and the rod 42 to move into position to become engaged with the lock-out arm cam 21 when the downlock mechanism 18 completes the downlock movement.

As described above, the landing gear is now in its down or extended position. On touch-down landing loads introduced at the tire and wheel 26 are transmitted to the torsion bar 11 by the torque arm 25. The torsion bar 11 is fixed at its inboard end by the lock-out arm 14 and locks 17 and 18 absorb the transmitted loads by angular deflection. If the landing impact exceeds the capacity of the torsion bar the latter will continue to twist, perhaps reaching its yield point before the aircraft fuselage engages the ground. The energy so absorbed by the torsion bar reduces the final ground contact energy so that the landing gear never "bottoms" with resultant damage to structural components of the aircraft, as any remaining impact energy can be absorbed by sliding of the bottom of the aircraft.

Having described only a typical embodiment of the invention I do not wish to be limited to the specific details set forth but reserve to myself any features that may fall within the scope of the following claims.

I claim:

1. A torsion bar type landing gear for use on an airplane fuselage, the combination comprising, a common mounting secured to the fuselage, twin torsion bars mounted transversely on the bottom of the airplane fuselage with their adjacent inboard ends rotatable in the common mounting on the approximate center line of the airplane fuselage, wheels operably connected to the outboard ends of the torsion bars to move to and from the fuselage in accordance with movement of the bars, actuating means disposed between the inboard ends of the bars and secured to the fuselage adjacent the common mounting for rotating the twin torsion bars, a lock arm secured to the inboard ends of the bars and rotatable therewith and a releasable uplock and downlock carried on the airplane fuselage actuated by the lock arm for retaining the landing gear in a retracted and extended position.

2. A torsion bar type landing gear for use on an airplane fuselage for supporting the fuselage above the ground, the combination comprising, a mounting secured to the fuselage, twin torsion bars mounted transversely with respect to the bottom of the airplane fuselage with their adjacent ends rotatable in common on the mounting on the approximate center line of the airplane fuselage, wheels operably connected to the outboard ends of the torsion bars to move to and from the fuselage in response to rotation of the bars, actuating means disposed between the inboard ends of the bars and secured to these ends for rotating the twin torsion bars, a lock arm secured to the inboard ends of the bars and rotatable therewith and a releasable downlock pivotally secured to the fuselage operable in response to the actuating means for retaining the wheels in an extended position from the fuselage upon contact of the wheels with the ground.

3. A torsion bar type landing gear for use on an airplane fuselage, the combination comprising, a common mounting secured to the fuselage, twin torsion bars mounted transversely on the bottom of the airplane fuselage with their adjacent inboard ends rotatably carried on the common mounting on the approximate center line of the airplane fuselage, torque arms attached to the outboard ends of the torsion bars, wheels carried by the torque arms having selected upward and downward positions with respect to the airplane fuselage, actuating means pivotally carried on the fuselage adjacent the mounting and secured to the inboard ends of the torsion bars to selectively rotate both torsion bars in a direction to move the wheels into one of the aforementioned positions, a lock arm secured to the inboard ends of the bars and rotatable therewith; a releasable uplock pivotally connected to the fuselage cooperating with the lock arm for retaining the landing gear in its upward position, and a releasable downlock pivotally connected to the mounting operably connected to the actuating means and cooperating with the lock arm for retaining the landing gear in its downward position.

4. A landing gear as defined in claim 1 wherein a mechanically engaged downlock is carried on the airplane fuselage to retain the extended landing gear in an extended position in cooperation with the lock arm, and whereby release of the uplock allows the wheel to fall into a partly extended and trailing position wherein ground contact will complete the extension motion and engage the lock arm with the downlock.

5. A retracting and extending mechanism for a torsion bar type of shock absorbing landing gear for an aircraft fuselage, wherein a torsion bar is disposed transversely of the bottom of the aircraft fuselage and carries a torque arm and landing wheel on its outboard end and a locking arm on its inboard end, a mounting secured to the fuselage bottom rotatably carrying the torsion bar, said retracting and extending mechanism comprising a downlock pivotally carried on the mounting engaging the locking arm in the extended position thereof preventing rotation of the torsion bar, a double acting fluid cylinder pivotally secured to the bottom of the fuselage, a piston rod operated by the cylinder, means carried by the piston rod to operate the downlock upon retraction movement of the piston, and linkage means associated with the piston rod to rotate the locking arm and torsion bar as a unit and thereby move the landing wheel into its retracted position.

References Cited in the file of this patent
UNITED STATES PATENTS

| | | |
|---|---|---|
| 1,442,155 | Klemin | Jan. 16, 1923 |
| 1,626,483 | Short | Apr. 26, 1927 |
| 2,227,762 | Ronning | Jan. 7, 1941 |
| 2,278,910 | Bertran | Apr. 7, 1942 |
| 2,587,624 | Johnson | Mar. 4, 1952 |

FOREIGN PATENTS

| | | |
|---|---|---|
| 412,593 | Great Britain | June 29, 1934 |
| 438,165 | Great Britain | Nov. 12, 1935 |
| 529,087 | Great Britain | Nov. 13, 1940 |
| 556,531 | France | Apr. 16, 1923 |
| 559,429 | France | June 15, 1923 |
| 715,712 | Germany | Jan. 6, 1942 |
| 829,039 | France | Mar. 7, 1938 |